United States Patent [19]

Deioma

[11] Patent Number: 5,647,303

[45] Date of Patent: Jul. 15, 1997

[54] CONSTRICTIVE COLLAR

[76] Inventor: David B. Deioma, 35 Greentree Rd., Chagrin Falls, Ohio 44022

[21] Appl. No.: 656,946

[22] Filed: Jun. 6, 1996

[51] Int. Cl.$^6$ .................................................. A01K 27/00
[52] U.S. Cl. ............................................................ 119/864
[58] Field of Search ................................. 119/864, 856, 119/863, 792

[56] References Cited

U.S. PATENT DOCUMENTS

| | | | |
|---|---|---|---|
| 2,438,979 | 4/1948 | Short | 119/676 |
| 4,022,161 | 5/1977 | Halperin | 119/864 X |
| 4,924,815 | 5/1990 | Halla | 119/864 |
| 4,996,948 | 3/1991 | Klein et al. | 119/864 |

FOREIGN PATENT DOCUMENTS

| | | | |
|---|---|---|---|
| 7704665 | 11/1977 | Netherlands | 119/864 |
| 831822 | 3/1960 | United Kingdom | 119/864 |

*Primary Examiner*—Robert P. Swiatek
*Assistant Examiner*—Yvonne R. Abbott
*Attorney, Agent, or Firm*—Pearne, Gordon, McCoy & Granger LLP

[57] ABSTRACT

An easily attachable and detachable, flexible constrictive collar, including a flexible member capable of fitting around an animal's neck and a first and second ends on the flexible member. A constrictive loop slidably engages the first end of the flexible member. A swivel fastener including a fastener opening, a swivel and a fastener clip is slidably engaged with the constrictive loop by having it pass through the fastener opening. The fastener clip is readily attachable and detachable from the second end of the flexible member. A pull ring on the constrictive loop is rotatable so that a lead attached thereto does not twist the constrictive loop.

20 Claims, 2 Drawing Sheets

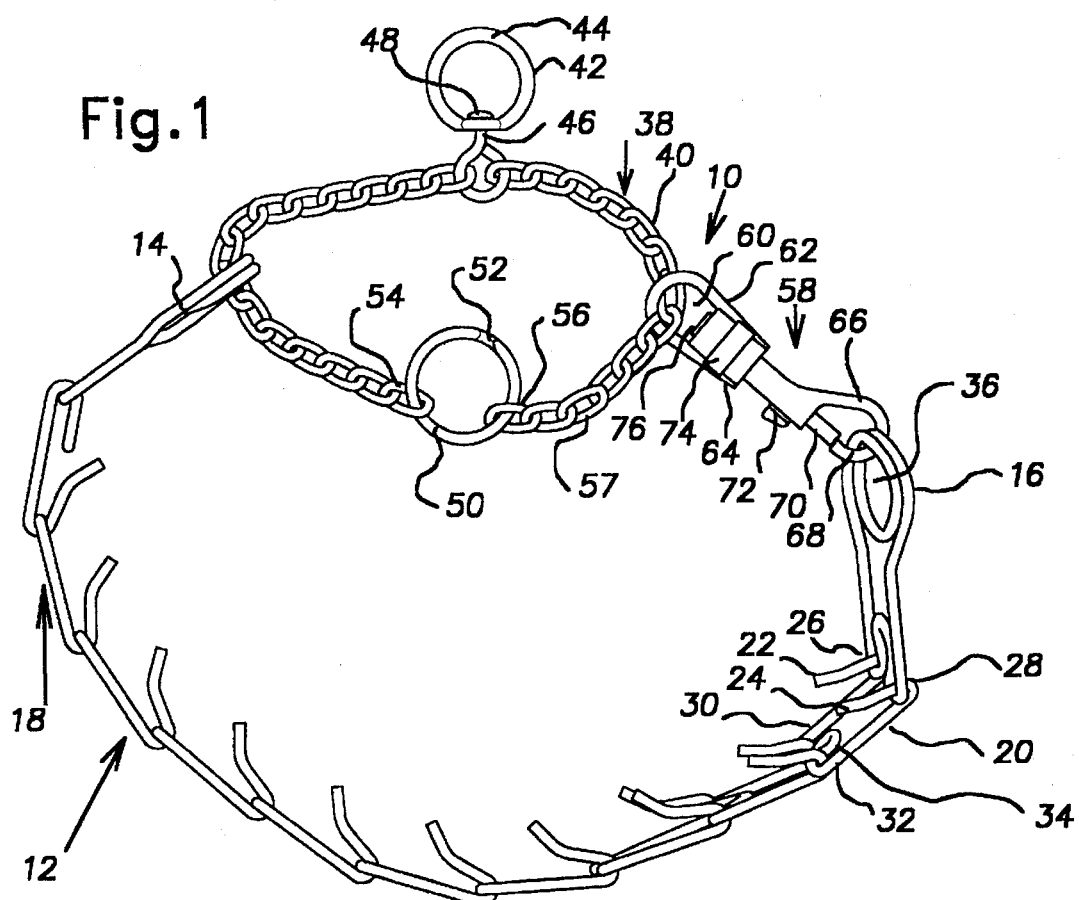

CONSTRICTIVE COLLAR

BACKGROUND OF THE INVENTION

There are, at present, many types of different collars used on animals and, in particular, dogs. Two of them are known as a chain pinch collar and a chain link collar. The chain pinch collar has a set of interlinking elements which generally have protruding fingers on one part of the link and loops formed on another part of the link. The fingers of one link engage the loops of an adjoining link. When placing most of the training collars on an animal, it is necessary to engage two fingers on one link with two loops on another link. Because the fingers are generally not in exact alignment with the loops, the fingers have to be squeezed to the proper relative locations in order to secure the collar around the dog's neck. On longhaired animals, the fingers and loops are not visible and thus are more difficult to engage. Moreover, when the dog is wiggling or moving slightly, which is almost all of the time, fastening the collar becomes a frustrating task. Handlers with arthritis or less than full dexterity can find this task nearly impossible.

The only way to change the relative size of a prior art pinch collar to accommodate the dog's neck is by removing or adding links to the collar. Thus, the sizing has to be done in increments which are often larger or smaller than desired. In the prior art, a constrictive chain passes through the ends of the interlinking chain and its ends are permanently fastened to a common ring. The constructive chain is normally not removable from either of the ends. It is known, however, to have one of the ends of the constrictive chain loose so that it can be threaded through one end of the link chain and then connected to a common connector. This threading procedure is even more difficult than connecting the links to one another.

This invention solves the problems of the prior art by utilizing a swivel fastener or a separate swivel and fastener attached to a constrictive loop. With this invention, the attachment and detachment of the collar on a dog or other animal becomes extremely easy. The use of the swivel fastener which, in a preferred embodiment is attached to a constrictive loop, is simply opened up with the thumb of one hand and connected to a flexible member in the other hand while placing it around a dog's neck. Because of the simple latching mechanism of the fastener clip, it is simply snapped in place. No threading of fingers and loops is required. As a result, the collar may be easily placed on a wiggling dog, a long-haired dog or on the side of the dog's neck which is not visible to the handler.

Another type of collar commonly used on animals and, in particular, dogs is the chain link collar. This collar is simply two rings connected by links to form a chain. The chain must be small enough to pass through one of the rings to form a loop. Because there is no fastener, the collar has to be long enough to be placed over the dog's head. Once on the dog, two rings are available to connect a lead. One is the choke ring which constricts the collar when it is pulled and the other is the nonchoke ring. If the choke ring is accidentally hooked on some element such as a fence or hook in a dog cage, some dogs will panic and pull on the collar to the point that they cause their own death by strangulation. Insensitive handlers can also damage a dog's trachea if too much force is put on the choke ring.

If a lead is attached to the nonchoke ring, the collar is so loose that the dog can literally back out of it and run free. In this manner, the dog may put itself and others at risk.

This invention solves both of the dangers of strangulation and unwanted removal of the chain link collar by the use of a constrictive loop having a limited range and a fastener. The constrictive loop attaches to each end of the chain collar. The constrictive loop is sized or constructed to limit the amount of constriction of the entire collar. The constrictive loop should be presized so that it only constricts the major portion of the collar by enough to make the collar uncomfortably snug but not enough to damage or strangle the animal. The amount of constriction can be varied either by placing one or more constrictive rings or constrictive stops on one part of the constrictive loop. Moreover, because a fastener is used, the collar does not have to be big enough to go over the dog's head. It can be premeasured so it fits snugly but nonconstrictively around the dog's or other animal's neck. Thus, the animal cannot slip it over its head.

By limiting the amount of constriction, this invention if properly sized to the dog will not strangle or injure it. Thus, a dog will not strangle itself when accidentally hooking one of the rings on some item. If the constriction is limited to about 5–15% of its length, the collar should not do any permanent damage. Greater constriction loop lengths can be provided in special circumstances.

Another common problem encountered with fastening a chain training collar is that part of it becomes twisted when placing it on the dog. Removal and refastening is then necessary. To solve this problem, this invention uses a swivel that is attached between the constrictive loop and either of the chain collars described. A swivel has the advantage of automatically unwinding any inadvertent twisting of the components when the collar is fastened on the animal or object.

U.S. Pat. No. 188,043 to N. Elmore, which is incorporated by reference, discloses the use of limited choking action on a leather collar but it does not disclose the use of a swivel which keeps the parts in relative alignment. Without the swivel, the Elmore collar may be attached in a twisted manner. To straighten it out requires unbuckling it. The use of the Elmore collar also requires buckling a conventional strap which is more difficult and time consuming than using a clip. Further, Elmore does not disclose a structure useable on a chain collar or an adjustment of the constrictive loop.

While this collar invention has been described with respect to animals, it has other applications. It can be used to grasp other things, i.e. packages. The collar could be fastened around a package and then lifted by the constrictive loop so that the package is held securely by the flexible member.

SUMMARY OF THE INVENTION

An easily attachable and detachable flexible constrictive collar, including a flexible member capable of fitting around an animal's neck, the flexible member having a first and second end. A constrictive loop operatively engages the first end of the flexible member. A swivel fastener or a separate swivel and fastener is operatively attachable to the constrictive loop and the second end of the flexible member so that the flexible member can be placed around the animal's neck and attached by use of the fastener. The constrictive loop slides relative to at least one of the first and second end of the flexible member whereby the first flexible member can be tightened by pulling on the constrictive loop.

This invention also anticipates the possible use of a constrictive loop being added to existing flexible collars. In this case, the constrictive loop would include at least a first fastener and a swivel to reduce twisting. Preferably a first and second fastener are connected to the constrictive loop. At least one of the fasteners must be slidably attached to the loop. The first and second fasteners may be attached to the first and second ends of a flexible member.

A BRIEF DESCRIPTION OF THE DRAWINGS

FIG. 1 is a perspective view of a chain training collar utilizing this invention.

FIG. 2 is a perspective view of an alternate embodiment of a chain link collar utilizing this invention.

DETAILED DESCRIPTION OF THE DRAWINGS

Figure 3:
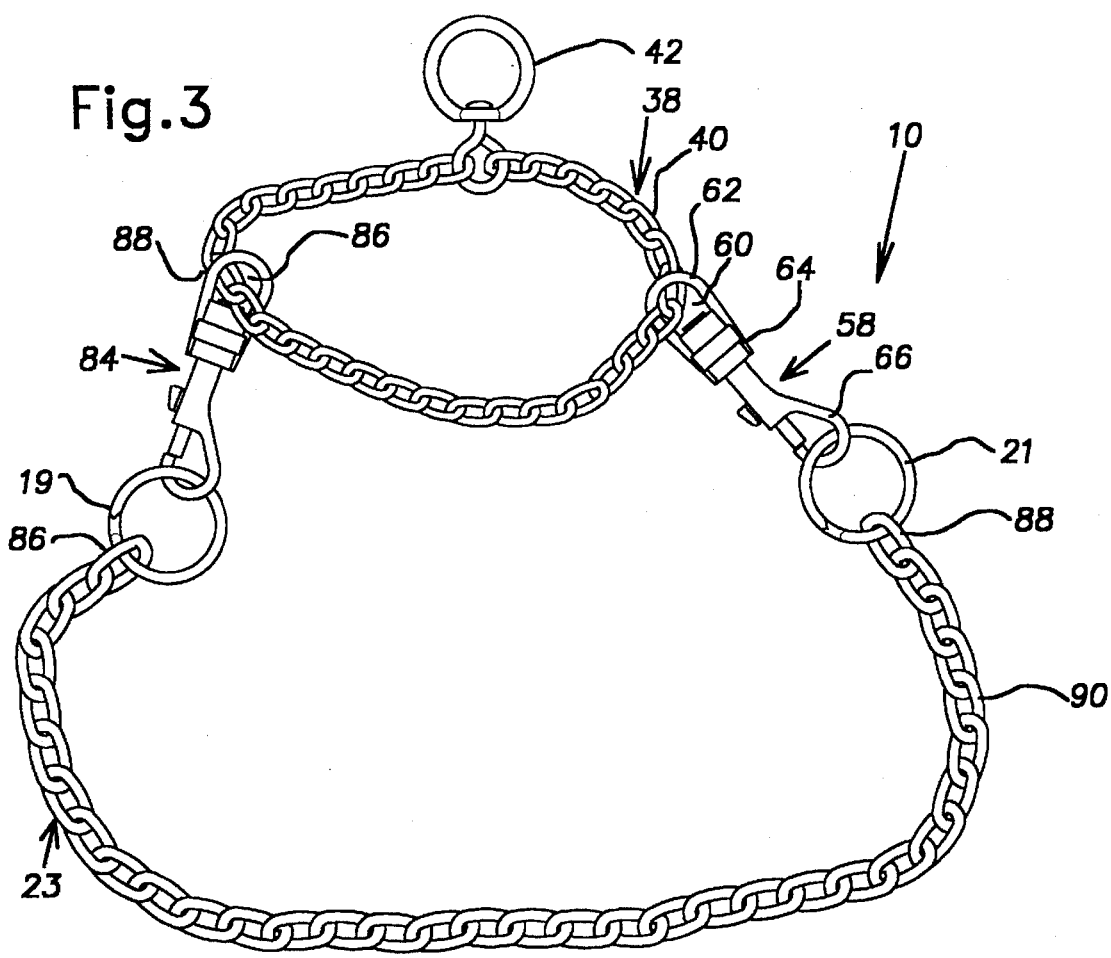
FIG. 3 is a perspective view of an alternate embodiment of this invention using two detachable swivel fasteners.

FIGS. 1 and 2 show (using the same numbers where applicable), easily attachable and detachable flexible constrictive collars 10 and 11 including flexible members 12 and 13. The collar 10 has a first end 14 and a second end 16. In FIG. 1, the flexible member is a chain 18 formed of fingered links 20. Each fingered link 20 includes fingers 22 and 24 which pass through finger receiving recesses 26 and 28, respectively. The finger receiving recesses 26 and 28 are formed by bending the links 20 so that there are outer legs 30 and 32 and an inner U-shaped portion 34. The first end 14 and second end 16 have slightly different shapes at one end thereof in order to provide openings as shown at 36 formed by coiling the metal. Obviously, any type of opening may be utilized in a link and this invention is not limited to any special type of ends of the chain. Variations in the shape and size of the links will be obvious to one skilled in the art.

A constrictive loop 38 includes a series of links 40 which are operatively attached to each other and to a lead connector 42 having a ring 44 which is rotatably attached to a base 46. The ring 44 has an opening (not shown) which sits loosely on the base 46. The base 46 has a head 48 which is larger than the opening in the lead connector 42 in order to prohibit any removal thereof.

A constrictive ring 50 on the other side of the ends 14 and 16 is also attached to the constrictive loop 38 by having links thereof pass over the ring 50. The term "ring" as used in all embodiments means any closed structure with an opening. It does not have to be circular or any other shape. The term "end" means the place where the constrictive loop attaches. The "end" may or may not be the last link or part of the flexible member in any of the embodiments. It should be apparent that the sizing of the chain links 40 should be sufficiently large to have the base 46 and the constrictive ring 50 pass easily therethrough. The constrictive ring is shown having an optional split portion 52 so that it may be attachable to links 54 and 56. By using a split ring 52, it is possible to easily shorten the length of the constrictive loop 38 by attaching the split ring 52 to a different link; e.g. link 57. Shortening of the constrictive loop 38 will reduce the length of the collar and the amount of constriction which may be applied to the flexible member 12. The diameter of the ring 50 will also act to limit the restriction or closure of the flexible member 12.

Split ring 52 may be any other type of removable or non removable fastener capable of holding the links 54 and 56 together. Equivalents to the split ring 52 would be a ring with a spring actuated plunger, a coiled spring, a pivoting ring or any other removable and reattachable connector. It is desirable that the ring 52 or other connector and the lead connector 42 are larger than the openings in the ends of 14 and 16 so that they will not pass therethrough. The constrictive ring 52, while desirable for modifying the length of the restrictive loop 38 is not necessary. If desired, it may be eliminated altogether and the chain 40 may be continuous through the entire portion of the constriction loop. The constrictive loop 38 could also function without the lead connector 38. A lead could be attached over the links 40.

In FIGS. 1 and 2, a swivel fastener 58 includes a fastener opening 60 formed by the base 62, a swivel 64 and a fastener clip 66. The fastener clip 66 is formed by an outer J-shaped portion 68 and a spring biased plunger 70 which is motivated by an actuator 72. The base 62 forms a cylinder 74 which rotatably surrounds a rod portion 76 of the fastener clip 66. For convenience, this rotatable connection is called a swivel herein but may be other structures as long as one part rotates relative to another. The fastener clip 66 is easily and readily rotatable about the opening 60 and is readily attachable and detachable from either the second end 16 in FIG. 1 or the constrictive loop as shown in FIG. 2. In particular, in FIG. 1, the opening 60 is slidably engaged with the constrictive loop 38 and the clip 66 is readily attachable and detachable from the second end 16 of the flexible member 12. These relative positions of the clip and openings may be reversed as shown in FIG. 2.

In use, the collar of FIG. 1 is easily attachable to an animal or object but usually a dog's neck. Thumb actuation of the actuator 72, pulls down the plunger 70 and the clip 66 is attached to one end 16 of the flexible member 12. The connection and removal of the clip can be done "blind." That is, it may be attached and removed without visual contact. For example, it may be done on the opposite side of the animal's neck or with a longhaired dog or with a dog that has a tendency to move.

In use the collar is tightened by pulling on the lead connector 42, thus pulling the ends 14 and 16 toward one another. As these ends converge, the fingers 22 and 24 on each link have a tendency to converge toward one another, thus giving a gentle pinching action to the skin. Training collars, as illustrated in FIG. 1, have blunt smooth ends on the fingers so that there is no piercing or puncturing of the skin when properly used. The amount of pinching action can be regulated by shortening or lengthening the length of the constrictive loop 38 by means of ring 42 or ring 50. The shorter the loop, the less the convergence of the ends 14 and 16 and the less the pinching action. Moreover, if the loop 38 was twisted when attached, the first pull on the ring 42 will rotate the swivel 64 and put the parts in alignment.

As illustrated in FIG. 2, a similar constrictive collar but without the fingered links is shown and the same numbers have been utilized to illustrate similar parts. The first end 15 is formed by a split ring and is attached to the flexible member 13 which, in this embodiment, is a link chain. The split or otherwise removable ring 15 is optional but convenient for slidably receiving the constrictive loop 38 and for attachment to different, for example, link 78, to shorten or lengthen the flexible member 13. A second end 17 is operatively engaged by the base 62 of the fastener 58 which slidably clips to the constrictive loop 38. The flexible member or constrictive loop may be a chain as shown in FIGS. 1 and 2 or flexible strap or cord of natural or synthetic material such as leather or polymeric material. Other various shapes and materials will be obvious to those skilled in the art.

To function, it is only necessary that the constrictive loop 38 be able to slidably engage at least one of the ends of the flexible member 13. The constrictive loop 38 works more smoothly however if it is slideable relative to both the first and second ends of the flexible member. In FIG. 2, a removable split ring 80 is shown and may be any of the various types noted above. The ring 80 is shown for convenience for shortening the constrictive loop 38 as well as being the location for securing a lead. An optional constrictive stop 82 is illustrated in FIG. 2. The constrictive stop 82 may be any type of removable abutment that is too large to pass through the opening in the first end 14 or 15. The constrictive stops may be placed at various locations in order to limit the constrictive length of the constrictive loop 38. Constrictive stops permit a variance of the amount of constriction of the flexible member 12 without the inconvenience of removing the ends of the constrictive loop from either the ring 50 or 80 and reattaching to a different link. A plurality of constrictive stops such as 82 could be used on any of the embodiments either with or without the use of the constrictive ring 50 or the lead connectors 80 and 42. In this way, the same collar could be sized for different constructions and/or for different sized animals.

While a swivel is very important to the smooth functioning of the constrictive collar, it does not have to be part of the fastener 58. The swivel and the fastener may be separate elements.

In operation, the collar illustrated in FIG. 2 is placed around the animal's neck so that it is "fitted" but not constrictive nor loosely hanging. The fastener 58 is attached to the constrictive loop 38 at any portion. Pulling on either the rings 50 or 80 will cause a constriction of the collar and a restraint of the animal. In all embodiments, the amount of constriction is estimated to be about 5–15% of the length of the flexible member but may vary from 2–20%. Less or greater constriction could be used in special cases but 10% constriction of the length of the constrictive loop is often preferred. In FIG. 2 if the constrictive stop 82 were used, the lead would be attached to the ring 80. It should be noted, in FIGS. 1 and 2 and in the other embodiments illustrated, that the swivel has a tendency to keep the parts aligned. That is, if there is any twisting of the collar that has occurred during placement of it on the animal, when either of the rings are pulled the swivel on the swivel fastener will rotate and align the constrictive loop 38 and flexible members 12 or 13.

Figure 4:
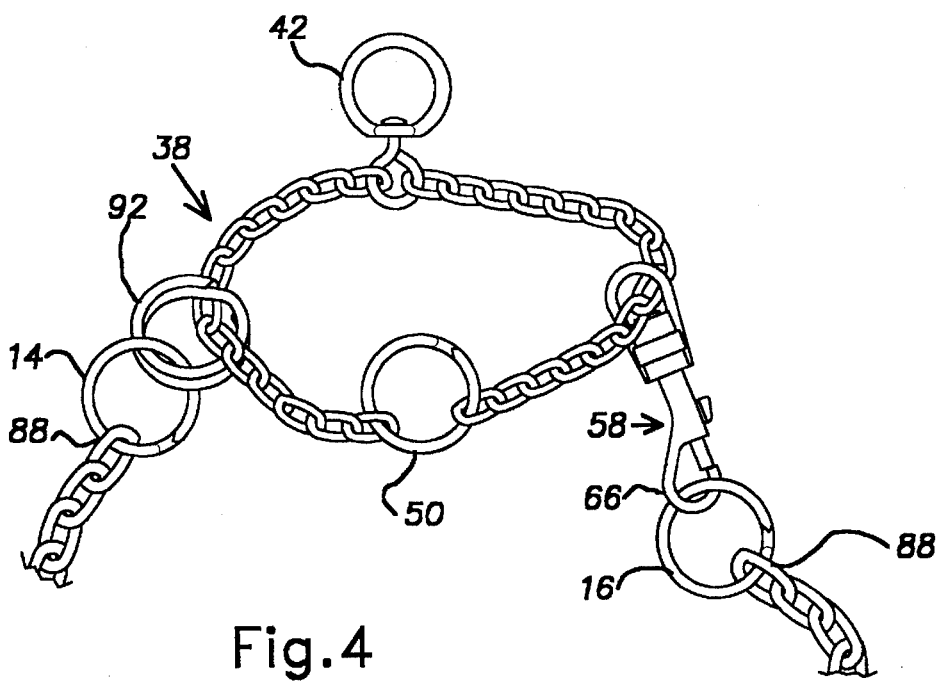
FIG. 4 is a perspective view of alternate embodiment of this invention utilizing a swivel fastener and a ring fastener.

FIGS. 3 and 4 illustrate devices with some similarity to FIGS. 1 and 2 and the same numbers for similar parts are loop 38 may be placed on any existing chain or flexible collars. By use of the first swivel fastener 58 as discussed earlier and a second swivel fastener 84, which is identical to swivel fastener 58, the constrictive loop 38 may be attached to the first end 19 and the second end 21 of a flexible member 23. The terms first and second ends are used for convenience and do not limit any structure. Each term just means either end. The ends 19 and 21 are illustrated as split rings although they may be solid rings, retractable rings, pivotable rings or the like, or no ring. This is true of all embodiments. That is, the swivel fasteners may be directly attached to the end links 86 and 88 provided they are of sufficient size to allow the fastener clips to pass therethrough. The advantage of using split rings 19 and 21 or end links 86 and 88 large enough to be attached by 58 or 84 would be that the flexible member 38 could be sized to different animal's necks. In this sense, as used herein, "ends" are simply used to mean the portion operatively engaged to the constrictive loop 38. It does not have to be the actual last link or ring. For example, in FIG. 3, the fastener 58 may be attached to a link 90 for an animal with a smaller neck. The collar would still operate and function. The chain 40 slidably passes through the opening 60 or the clip 66. For purposes of illustration, there is no constrictive ring shown in FIG. 3 so that the bases 62 and 86 of fasteners 58 and 84 may be drawn together.

FIG. 4, an alternate embodiment of FIG. 3 illustrates the second fastener as a coiled ring 92. Again, anyone skilled in the art could replace the coiled spring 92 with any type of fasteners which may slidably or not slidably engage the constrictive loop 38.

In all of the embodiments illustrated in FIGS. 1 through 4, it is critical that the restrictive loop be operatively slidably engaged with at least one of the ends of the flexible member 12. Smoother action however results if it is slidably engaged by both ends. The use of a swivel in between the constrictive loop and the flexible member greatly alleviates any unintentional twisting or rotation of the flexible member or the constrictive loop relative to themselves or each other. It is the use of this combination of features which allows the collar of this invention to be easily and safely attached and detached from animals or objects and resist twisting. This invention is more humane and safer on the animals on which it is used. As noted above, limiting the amount of constriction causes discomfort but not pain or danger. When properly sized, the collar of this invention will eliminate tightening of the collar to the point that seriously damages an animal's throat or causes a fatality.

There are many other fasteners and swivels than the one illustrated herein which are included in the scope of this invention.

Although particular embodiments of the invention have been described in detail, it will be understood that the invention is not limited correspondingly in scope, but includes all changes and modifications coming within the spirit and terms of the claims appended hereto.

What is claimed is:

1. An easily attachable and detachable, flexible constrictive collar comprising:
    a flexible member capable of fitting around an animal's neck;
    first and second ends on the flexible member;
    a constrictive loop operatively engaging the first end of the flexible member;
    a swivel operatively attached to the constrictive loop and the flexible member to reduce twisting of them, a fastener for readily connecting and disconnecting the constrictive loop and the flexible member so that the flexible member can be placed around an animal's neck and attached, the constrictive loop slidable relative to at least one of the first and second ends of the flexible member, whereby the first flexible member can be tightened by pulling on the constrictive loop.

2. The flexible constrictive collar of claim 1, wherein the constrictive loop has a ring and the length of the constrictive loop is adjustable.

3. The flexible constrictive collar of claim 1, wherein said fastener has a fastener base with fastener opening and a fastener clip, the constrictive loop slidably passing through the fastener opening and the fastener clip being readily attachable to and detachable from the second end of the flexible member.

4. The flexible constrictive collar of claim 3, wherein the flexible member has interlocking links with fingers which converge when the constriction member is pulled and the constrictive loop slidably engages the first end of the flexible member.

5. The flexible constrictive collar of claim 3, wherein the constrictive member includes a pull ring, the first end of the flexible member has an opening through which the constrictive loop slidably passes and the swivel is part of the fastener.

6. The flexible constrictive collar of claim 5, wherein the flexible member and the constrictive loop are chains.

7. The flexible constrictive collar of claim 6, wherein the constrictive loop has one of a constrictive ring and a constrictive stop attached thereto to limit the amount of constriction of the flexible member.

8. The flexible constrictive collar of claim 1, wherein the constrictive loop is a chain and has a removable ring to adjust its length by attachment to different links to limit the amount of constriction of the flexible member.

9. The flexible constrictive collar of claim 1, wherein there is a swivel fastener which has a fastener opening, the swivel and a fastener clip, the fastener opening operatively attached to the second end of the flexible member and the fastener clip is readily attachable to and detachable from the constriction loop whereby the constriction loop may slide through the fastener clip.

10. The flexible constrictive collar of claim 9, wherein there is a constrictive ring in the constrictive loop in order to limit the amount of constriction when the pull ring is pulled.

11. The flexible constrictive collar of claim 9, wherein the constrictive member has a pull ring attached thereto which is attachable by a lead, and the flexible member is a chain.

12. The flexible constrictive collar of claim 1, wherein a second fastener is attachable to the first end of the flexible member and the constrictive loop.

13. The flexible constrictive collar of claim 12, wherein the second fastener is a ring.

14. The flexible constrictive collar of claim 12, wherein the second fastener is a swivel fastener having a fastener opening, a swivel and a fastener clip, the constrictive loop slidably passing through the fastener opening and the fastener clip of the second fastener is readily attachable to and detachable from the first end of the flexible member.

15. The flexible constrictive collar of claim 12, wherein the flexible member and constrictive loop are chains.

16. The flexible constrictive collar of claim 12, wherein the constrictive loop has a removably constrictive ring attached thereto which may be attached to the constrictive loop in different places to adjust its length.

17. In a flexible constrictive collar having a flexible member capable of fitting around an animal's neck, first and second ends on the flexible member, the improvement comprising:

a constrictive loop, a first fastener connected to the constrictive loop and connectable to the flexible member and a swivel operatively attached on the constrictive loop to reduce twisting of the constrictive loop and the flexible member whereby the constrictive loop is attached to at least one of the first and second ends of the flexible member.

18. The improvement of claim 17, wherein the fastener is a swivel fastener having a swivel loop, the swivel and a swivel clip, the constrictive loop slidably passing through the swivel opening and the swivel clip readily attachable to and detachable from the first end of the flexible member.

19. The improvement of claim 18, wherein there is a second fastener which is a detachable ring, the detachable ring slidably connected to the constrictive loop.

20. The improvement of claim 18, wherein there is a second fastener which is a swivel fastener, the swivel fastener having a swivel opening, a swivel and a fastener clip, the constrictive loop passing slidably through the second fastener opening and the second fastener clip being readily attachable to and detachable from the second end of the flexible member.

* * * * *